3,804,843
AMINO DERIVATIVES OF PYRAZOLOPYRIDINE CARBONITRILES

Theodor Denzel, Nuremberg, and Hans Hoehn, Tegernheim, Germany, assignors to E. R. Squibb & Sons, Inc., Princeton, N.J.
No Drawing. Continuation-in-part of abandoned application Ser. No. 211,675, Dec. 23, 1971. This application Nov. 24, 1972, Ser. No. 309,291
Int. Cl. C07d 31/46
U.S. Cl. 260—294.9    9 Claims

ABSTRACT OF THE DISCLOSURE

New amino derivatives of pyrazolo[3,4-b]pyridine-5-carbonitriles have the general formula

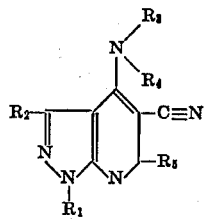

They are useful as central nervous system depressants. In addition, they also increase the intracellular concentration of adenosine-3′,5′-cyclic monophosphate.

---

This application is a continuation-in-part of application Ser. No. 211,675, filed Dec. 23, 1971, now abandoned.

SUMMARY OF THE INVENTION

This invention relates to new amino derivatives of pyrazolo[3,4-b]pyridine-5-carbonitriles and salts thereof. These new compounds have the formula

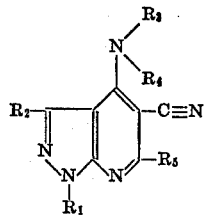

The symbols have the following meanings in Formula I and throughout this specification. $R_1$ is hydrogen, lower alkyl, phenyl or phenyl-lower alkylene. $R_2$ is hydrogen or lower alkyl. The basic nitrogen group

is an acylic amino moiety wherein $R_3$ and $R_4$ each is hydrogen, lower alkyl, cyclo-lower alkyl, hydroxy-lower alkyl, phenyl, substituted phenyl (i.e., the phenyl ring contains one or two simple substituents, e.g., a halogen, preferably chlorine, or trifluoromethyl), phenyl-lower alkylene or di-lower alkylamino-lower alkylene (except for lower alkyl, there is preferably only one of these substituent groups).

The basic groups may also form a heterocycle of 3,5- or 6-members in which an additional nitrogen may be present, i.e., the aziridinyl, pyrrolidino, piperidino, pyrazolyl, pyrimidinyl, pyrridazinyl or piperazinyl radicals each of which may also bear as a substituent a hydroxy-lower alkyl group or one or two lower alkyl groups.

$R_5$ is hydrogen or lower alkyl.

The products of the examples are representative of the various compounds of this invention. Preferably $R_4$ is hydrogen, particularly when $R_3$ includes a cyclic substituent or a substituted or unsubstituted acyclic group. Especially preferred compounds of Formula I are those wherein $R_1$ is ethyl, $R_2$ is hydrogen or methyl, $R_3$ is butyl, phenyl, substituted phenyl and tertiary amino and $R_4$ is hydrogen. $R_5$ is preferably hydrogen or methyl.

DETAILED DESCRIPTION OF THE INVENTION

The lower alkyl and lower alkylene groups in any of the radicals are straight or branched chain hydrocarbon groups of up to seven carbon atoms like methyl, ethyl, propyl, isopropyl, butyl, t-butyl and the like. The lowest four members are preferred. Benzyl and phenethyl are the preferred phenyl-lower alkylene groups. All four halogen are included, but chlorine is preferred.

The cyclo-lower alkyl groups are the three to seven carbon alicyclics cyclopropyl, cyclobutyl, cyclopentyl, cyclohexyl and cycloheptyl of which the 5- and 6-membered rings are preferred.

The basic nitrogen group

is an acyclic amino group wherein $R_3$ and $R_4$ each is hydrogen, lower alkyl, phenyl, substituted phenyl (i.e., the phenyl ring contains one or two simple substituents including halogen, especially chlorine, or trifluoromethyl), phenyl-lower alkylene or di-loweralkylamino-lower alkylene (preferably there is only one of these substituents other than lower alkyl). This basic group may also form a heterocycle of 3-, 5- or 6-members in which an additional nitrogen is present, in particular, aziridinyl, pyrrolidino, piperidino, pyrazolyl, pyrimidinyl, pyridazinyl or piperazinyl radicals, each of which may also bear as a substituent a hydroxy-lower alkyl group or one or two lower alkyl groups. That is to say, $R_3$ and $R_4$ each is hydrogen, lower alkyl, $R_6$, $R_7$, phenyl (wherein $R_6$ and $R_7$ each is hydrogen, halogen or trifluoromethyl), phenyl-lower alkylene, or di-lower alkylamino-lower alkylene or $R_3$ and $R_4$ together with the nitrogen to which they are attached form one of the heterocyclics mentioned above or the $R_8$-mono-substituted or $R_8$, $R_9$-disubstituted derivative (wherein $R_8$ and $R_9$ are the substituents lower alkyl or hydroxy-lower alkyl in addition to hydrogen).

The new compounds of Formula I are formed by the following series of reactions. The symbols in the structural formulas have the same meaning as previously described.

A 5-aminopyrazole of the formula (II)    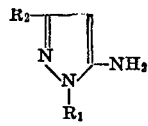

wherein $R_1$ is other than hydrogen [produced analogous to the procedure described in Z.f. Chemi 10, 386 (1970)], is made to react with an alkoxymethylene acetoacetic acid ester of the formula (III)    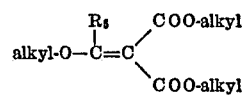

by heating at a temperature of about 120–130° C.
The resulting compound of the formula (IV)    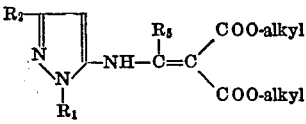

is cyclized in an inert organic solvent such as diphenyl ether at about 230° to about 260° C. while distilling off the alcohol formed, producing a compound of formula (V)

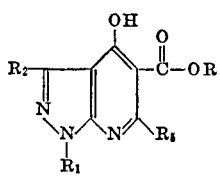

with a hydroxy group in the 4-position. R is alkyl, preferably lower alkyl.

The product of Formula V is alkylated, e.g. with an alkyl halide like ethyl iodide, in the presence of an alkali metal carbonate to obtain a compound of the formula (VI)

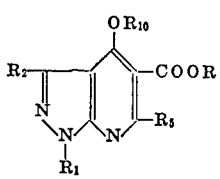

where $R_{10}$ is alkyl, preferably lower alkyl.

Saponification of the product of Formula VI, e.g. with a conventional base, for example an alkali metal hydroxide like potassium hydroxide, produces the carboxylic acid of the formula (VII)

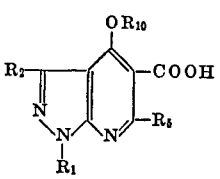

This carboxylic acid is transformed to the compound of Formula VIII in one step by treatment with an organic acid chloride, like thionyl chloride, followed by reaction with gaseous ammonia.

(VIII)

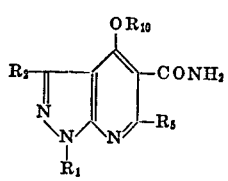

By repeating the reaction with the inorganic acid chloride using the compound of Formula VIII leads to the compound of the formula (IX)

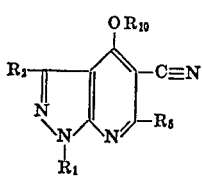

The product of Formula I is then prepared from the compound Formula IX by reaction with the appropriate primary or secondary amine of the formula (X)

This reaction is effected by treating the reactants either at room or elevated temperatures. For some cases it may be advantageous to make use of an autoclave.

When $R_1$ is hydrogen, the foregoing procedure must be modified in several steps. In this case, instead of using the 5-aminopyrazole of Formula II wherein $R_1$ is hydrogen, there is used a 5-aminopyrazole of the formula (IIa)

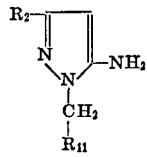

wherein $R_2$ is the same as previously defined and $R_{11}$ is an aromatic group like phenyl or naphthyl or preferably a heterocyclic like furyl, pyridyl or other 5- and 6-membered nitrogen heterocyclics. This starting material is processed through the steps described above until the compound of Formula VI is obtained, in this case with the —$CH_2$—$R_{11}$ group in the 1-position. At this point the —$CH_2$—$R_{11}$ group may be removed by oxidizing with an inorganic oxide, preferably selenium dioxide in an inert organic solvent at a temperature within the range of about 110° to 160° C. This produces a compound of Formula VI wherein $R_1$ is hydrogen. Then the further treatment as described above is resumed.

The compounds of Formula I form salts which are also part of this invention. The salts include acid-addition salts, particularly the non-toxic, physiologically acceptable members. The bases of Formula I form salts by reaction with a variety of inorganic and organic acids providing acid addition salts including, for example, the hydrohalides (especially the hydrochloride), sulfate, nitrate, phosphate, oxalate, tartrate, malate, citrate, acetate, ascorbate, succinate, benzenesulfonate, toluenesulfonate, cyclohexanesulfonate, cyclohexanesulfamate, etc. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of Formula I, or non-toxic, physiologically acceptable acid addition salt thereof, may be administered orally or parenterally in a conventional dosage form such as tablet, capsule, injectable or the like. A single dose, or preferably 2 to 4 divided doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably about 10 to 50 mg./kg. in single or two to four divided doses in conventional oral or parenteral dosage forms such as those described above may be used to alleviate the symptoms of asthma.

The following examples are illustrative of the invention. All temperatures are on the centigrade scale.

EXAMPLE 1

4-butylamino-1-ethyl-1H-pyrazolo[3,4-b]pyridine-5-carbonitrile (a) [[(1 - ethyl-5-pyrazolyl)amino]methylene]malonic acid diethyl ester.—245 g. of 1-ethyl-5-aminopyrazole (2.2 mol.) and 476 g. of ethoxymethylene malonic acid diethyl ester (2.2 mol.) are heated to 120° (bath temperature) for 2 hours with stirring. The ethanol formed by this reaction is removed by means of a water aspirator. Then vacuum distillation (B.P. 0.1 154–160°) yields 520 g. 84% of theory) of a quickly crystallizing oil of [[(1-ethyl-5-pyrazolyl)amino]methylene]malonic acid diethyl ester, M.P. 50–53°.

The compound is recrystallized from n-hexane, M.P. 55–57°.

(b) 1 - ethyl-4-hydroxy-1H-pyrazolo[3,4-b]pyridine-5-carboxylic acid ethyl ester.—253 g. of [[(1-ethyl-5-pyrazolyl)amino]methylene]malonic acid diethyl ester (0.09 mol.) are dissolved in 770 g. of diphenyl ether. The reaction mixture is heated to 235–250° (bath temperature) and allowed to react at this temperature for 1–2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4-b]-pyridine-5-carboxylic acid ethyl ester is obtained at B.P. 0.05 115–120°, yield 195 g.=92% of theory, M.P. 85–87°. The compound is recrystallized from benzene (90 to 100°), M.P. 87–89°.

(c) 4-ethoxy - 1 - ethyl-1H-pyrazolo[3,4-b]pyridine-5-carboxylic acid ethyl ester.—In a solution of 259 g. (1.1 mol.) of 1-ethyl-4-hydroxy-1H-pyrazolo[3,4-b]pyridine-5-carboxylic acid ethyl ester in 1700 ml. of dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy - 1 - ethyl-1H-pyrazolo-[3,4-b]pyridine-5-carboxylic acid ethyl ester crystallize out of the solution, M.P. 112–115°. After evaporation of the mother liquor, an additional 80 g. are obtained. The total yield amounts to 85% of theory. The compound is recrystallized from benzene (90–100°), M.P. 113–115°.

(d) 4-ethoxy-1-ethyl - 1H - pyrazolo[3,4-b]pyridine-5-carboxylic acid.—263 g. of 4-ethoxy-1-ethyl-1H-pyrazolo-[3,4-b]pyridine-5-carboxylic acid ethyl ester (1 mol.) are heated with a solution of 114 g. of potassium hydroxide (2 mol.) in 1 liter ethanol at 60° for 12 hours. After this time the solvent is removed in vacuo and the residue is dissolved in 1.5 liters of water. After acidifying with acetic acid, 4 - ethoxy-1-ethyl-1H-pyrazolo[3,4-b]pyridine-5-carboxylic acid precipitates. Recrystallization from alcohol yields 215 g. (91%), M.P. 198–199°.

(e) 4-ethoxy - 1 - ethyl-1H-pyrazolo[3,4-b]pyridine-5-carboxamide.—117.5 g. of 4-ethoxy-1-ethyl-pyrazolo[3,4-b]pyridine-5-carboxylic acid (0.5 mol.) is slowly added with stirring to 300 ml. of thionyl chloride. The mixture is refluxed for 4 hours, excess thionyl chloride is removed in vacuo and the residue is dissolved in 1 liter of anhydrous tetrahydrofuran. For 3 hours gaseous ammonia is passed through the solution with vigorous stirring at 60°. After this time, the precipitated 4-ethoxy-1-ethyl-1H-pyrazolo[3,4-b]pyridine-5-carboxamide is filtered, washed with water and recrystallized from ethanol, yield 92 g. (94%), M.P. 168–170°.

(f) 4-ethoxy-1-ethyl - 1H - pyrazolo[3,4-b]pyridine-5-carbonitrile.—117 g. of 4-ethoxy - 1 ethyl-1H-pyrazolo-[3,4-b]pyridine-5-carboxamide (0.5 mol.) are added to 350 ml. of thionyl chloride and the mixture is refluxed for 5 hours. After that time, the excess thionyl chloride is distilled off, the residue is neutralized with saturated sodium bicarbonate solution, and extracted four times with 100 ml. portions of chloroform. The organic layer is collected, dried over sodium sulfate, filtered and evaporated to dryness. The residue yields on recrystallization from alcohol 82 g. of 4-ethoxy-1-ethyl-1H-pyrazolo[3,4-b]pyridine-5-carbonitrile (76%), M.P. 175–176°.

(g) 4-butylamino - 1 - ethyl-1H-pyrazolo[3,4-b]pyridine-5-carbonitrile.—2.16 g. of 4-ethoxy-1-ethyl - 1H - pyrazolo[3,4-b]pyridine-5-carbonitrile (0.01 mol.) are refluxed for one hour together with 10 ml. of n-butylamine. The mixture is cooled, 50 ml. of water are added and the precipitated 4-butylamino - 1 - ethyl-1H-pyrazolo[3,4-b]pyridine-5-carbonitrile is filtered and recrystallized from petrolether, yield 1.8 g. (74%), M.P. 111–112°.

EXAMPLE 2

4-butylamino-3-methyl-1H-pyrazolo[3,4-b]pyridine-5-carbonitrile (a) [[[-1(2-furyl)methyl - 3 - methyl - 5 - pyrazolyl] amino]methylene]malonic acid diethyl ester.—177 g. of 1-(2-furyl)methyl-3-methyl - 5 - aminopyrazole (1 mol.) and 216 g. of ethoxymethylene malonic acid diethyl ester (1 mol.) are heated to 130° until the theoretical amount of alcohol is distilled off. The remaining oil, [[[1-(2-furyl)methyl-3-methyl - 5 - pyrazolyl]amino]methylene] malonic acid diethyl ester, is recrystallized from methanol, yield 305 g. (88%), M.P. 95°.

(b) 4-hydroxy-1-(2-furyl-)methyl - 3 - methylpyrazolo-[3,4-b]pyridine-5-carboxylic acid ethyl ester.—347 g. of [[[1-(2 - furyl)methyl - 3 - methyl-5-pyrazolyl]amino] methylene]malonic acid diethyl ester (1 mol.) are dissolved in 1 liter of diphenyl ether and heated to 240° for 2 hours. The ethanol formed is continuously distilled off. The solvent is removed in vacuo. The 4-hydroxy-1-(2-furyl(methyl - 3 - methylpyrazolo[3,4-b]pyridine-5-carboxylic acid ethyl ester remains and is recrystallized from methanol, yield 182 g. (60%), M.P. 82°.

(c) 4 - ethoxy - 1 - (2-furyl)methyl-3-methylpyrazolo-[3,4-b]pyridine-5-carboxylic acid ethyl ester.—150 g. of 4 - hydroxy - 1-(2-furyl)methyl-3-methylpyrazolo-[3,4-b] pyridine-5-carboxylic acid ethyl ester (0.5 mol.) 140 g. of potassium carbonate and 155 g. of ethyl iodide are suspended in 500 ml. of dimethylformamide and heated with stirring at 60° for 10 hours. After this time, the excess potassium carbonate and precipitated potassium-iodide are filtered. The filtrate is diluted with 500 ml. of water. 4-ethoxy - 1 - (2-furyl)methyl-3-methylpyrazolo[3,4-b]pyridine-5-carboxylic acid ethyl ester precipitates and is recrystallized from hexane, yield 125 g. (76%), M.P. 82°.

(d) 4 - ethoxy - 3-methyl-1H-pyrazolo[3,4-b]pyridine 5-carboxylic acid ethyl ester.—16.4 g. of 4-ethoxy-1-(2-furyl)methyl-3-methylpyrazolo[3,4-b]pyridine carboxylic acid ethyl ester (0.05 mol.) and 11.1 g. of selenium dioxide (0.1 mol.) are suspended in 50 ml. of diethyleneglycol dimethylether and heated at 160°. A few drops of water are added and the temperature is maintained for 1.5 hours. After cooling, the mixture is filtered and diluted with 20 ml. of water. 4-ethoxy-3-methyl-1H-pyrazolo[3,4-b]pyridine-5-carboxylic acid ethyl ester is formed and recrystallized from ethanol.

(e) 4 - butylamino - 3 - methyl-1H-pyrazolo[3,4-b] pyridine-5-carbonitrile.—By treating the product of part d above according to the procedure of parts d, e, f and g of Example 1, 4-butylamino-3-methyl-1H-pyrazolo[3,4-b] pyridine carbonitrile is obtained.

EXAMPLE 3

4-butylamino-1-ethyl-6-methyl-1H-pyrazolo[3,4-b] pyridine-5-carbonitrile (a) 1 - ethyl - 6-methyl-4-hydroxy-1H-pyrazolo[3,4-b] pyridine-5-carboxylic acid ethyl ester.—51.1 g. of 1-ethyl-5-aminopyrazole (0.46 mol.) and 101 g. of acetomalonic acid ethyl ester (0.5 mol.) are added to 224 g. of polyphosphorous acid. The mixture is heated with stirring at 120° for three hours. After this period, the mixture is cooled, diluted with 1000 ml. of water and subsequently extracted twice with 300 ml. portions of chloroform. The chloroform layers are collected, dried over sodium sulfate and the solvent is distilled off. Recrystallization of the residue (67 g.) with petroleum ether yields 1-ethyl-6-methyl - 4 - hydroxy - 1H-pyrazolo[3,4-b]pyridine-5-carboxylic acid ethyl ester, M.P. 118–120°.

(b) ethoxy - 1 - ethyl - 6-methyl-1H-pyrazolo[3,4-b] pyridine-5-carboxylic acid ethyl ester.—By treating the product of part *a* with potassium carbonate and ethyl iodide according to the procedure of Example 1c and working up the product as in that example, 4-ethoxy-1-ethyl - 6-methyl-1H-pyrazolo[3,4-b]pyridine-5-carboxylic acid ethyl ester is obtained.

(c) 4 - ethoxy - 1-ethyl-6-methyl-1H-pyrazolo[3,4-b]pyridine-5-carboxylic acid.—The product of part *b* is treated with potassium hydroxide and worked up as in Example 1d to obtain 4-ethoxy-1-ethyl-6-methyl-1H-pyrazolo[3,4-b]pyridine-5-carboxylic acid.

(d) 4 - ethoxy - 1 - ethyl-6-methyl-1H-pyrazolo[3,4-b]pyridine-5-carboxamide.—The product of part *e* is treated with thionyl chloride and worked up as in Example 1e to obtain 4 - ethoxy - 1-ethyl-6-methyl-1H-pyrazolo[3,4-b]pyridine-5-carboxamide.

(e) 4 - ethoxy - 1-ethyl-6-methyl-1H-pyrazolo[3,4-b]pyridine-5-carbonitrile.—The product of part *d* is again treated with thionyl chloride and worked up as in Example 1f to obtain crystalline 4-ethoxy-1-ethyl-6-methyl-1H-pyrazolo[3,4-b]pyridine-5-carbonitrile, M.P. 180–182°.

(f) 4 - butylamino - 1-ethyl-6-methyl-1H-pyrazolo[3,4-b]pyridine-5-carbonitrile.—The product of part *e* is refluxed with n-butylamine according to the procedure of Example 1g to obtain 4-butyl-amino-1-ethyl-6-methyl-1H-pyrazolo[3,4-b]pyridine - 5 - carbonitrile, M.P. 159–160°. The following additional products are obtained by the procedure of Example 1 by substituting the appropriate 5-aminopyrazole for the 1-ethyl-5-aminopyrazole in part *a* or by substituting the appropriate amine for the n-butylamine in part *g*:

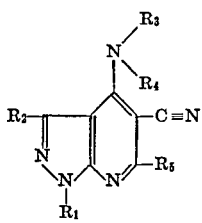

| Ex. | $R_1$ | $R_2$ | $N{<}^{R_3}_{R_4}$ | $R_5$ |
|---|---|---|---|---|
| 4 | $C_6H_5CH_2{-}$ | H | $-NH_2$ | H |
| 5 | $C_6H_5$ | $C_2H_5$ | $-N(C_2H_5)_2$ | H |
| 6 | n-$C_3H_7$ | $CH_3$ | $-N(CH_3)_2$ | $CH_3$ |
| 7 | H | H | $-NHC_4H_9(n)$ | H |
| 8 | $C_2H_5$ | $CH_3$ | $-NHC_4H_9(n)$ | $C_2H_5$ |
| 9 | $C_2H_5$ | $C_2H_5$ | $-NH-C_6H_5$ | H |
| 10 | $C_2H_5$ | $CH_3$ | -N◁ (aziridinyl) | H |
| 11 | $C_2H_5$ | H | -N⬠ (pyrrolidino) | H |
| 12 | $C_2H_5$ | $CH_3$ | -N⬡ (piperidino) | $CH_3$ |
| 13 | $C_2H_5$ | $CH_3$ | -N⬡NH (piperazinyl) | H |
| 14 | $C_2H_5$ | $CH_3$ | -N⬡NH | H |

TABLE—Continued

| Ex. | $R_1$ | $R_2$ | $N{<}^{R_3}_{R_4}$ | $R_5$ |
|---|---|---|---|---|
| 15 | $C_2H_5$ | $CH_3$ | -N⬡N$C_2H_4$OH | H |
| 16 | H | $CH_3$ | $-NH_2$ | $C_2H_5$ |
| 17 | $C_6H_5C_2H_4{-}$ | $CH_3$ | $-NHC_4H_9(n)$ | H |
| 18 | $C_2H_5$ | H | $-NHC_2H_4OH$ | H |
| 19 | H | H | -N⬡N$-$CH$_3$ | |
| 20 | $C_6H_5CH_2$ | $C_2H_5$ | $-NH-$⬡(Cl,Cl) | H |
| 21 | $C_2H_5$ | $C_2H_5$ | $-NHCH_3$ | $CH_3$ |
| 22 | $C_2H_5$ | $C_2H_5$ | $-NH-$⬡$CF_3$ | H |
| 23 | $C_2H_5$ | $C_2H_5$ | $-N(H)-C_2H_4N(C_2H_5)_2$ | $CH_3$ |
| 24 | $CH_3$ | H | $-NHCH_2CH_2-$⬡ | H |
| 25 | $C_2H_5$ | H | -N◁(CH$_3$)(CH$_3$) | H |
| 26 | $CH_3$ | H | -N⬠CH$_3$ | H |
| 27 | $C_2H_5$ | H | -⬠S | H |
| 28 | $C_2H_5$ | $CH_3$ | -⬡S | H |

What is claimed is:
1. A compound of the formula

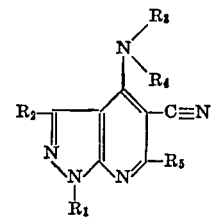

wherein $R_1$ is hydrogen, lower alkyl, phenyl, benzyl or phenethyl, $R_2$ is hydrogen or lower alkyl, $R_3$ and $R_4$ each is hydrogen, lower alkyl, cyclo-lower alkyl, $R_6$, $R_7$-phenyl, phenyl-lower alkylene, di-lower alkylamino-lower alkylene or $R_3$ and $R_4$ together with the nitrogen to which they are attached form one of the heterocyclics aziridinyl, methylaziridinyl, dimethylaziridinyl or pyrrolidino, $R_5$ is hydrogen methyl or ethyl, $R_6$ and $R_7$ each is hydrogen, halogen or trifluoromethyl, and physiologically acceptable acid addition salts of said compound.

2. A compound as in claim 1 wherein $R_1$ and $R_3$ each is lower alkyl and $R_2$, $R_4$ and $R_5$ each is hydrogen.

3. A compound as in claim 1 wherein $R_1$ is ethyl, $R_2$, $R_3$ and $R_5$ each is hydrogen and $R_4$ is butyl.

4. A compound as in claim 1 wherein $R_1$ is lower alkyl, $R_2$, $R_3$ and $R_5$ each is hydrogen, and $R_4$ is phenyl.

5. A compound as in claim 4 wherein the lower alkyl group is ethyl.

6. A compound as in claim 1 wherein $R_1$, $R_3$ and $R_5$ each is hydrogen, $R_2$ and $R_4$ each is lower alkyl.

7. A compound as in claim 6 wherein $R_2$ is methyl and $R_4$ is butyl.

8. A compound as in claim 1 wherein $R_1$, $R_3$ and $R_5$ each is lower alkyl and $R_2$ and $R_4$ each is hydrogen.

9. A compound as in claim 8 wherein $R_1$ is ethyl, $R_3$ is butyl and $R_5$ is methyl.

References Cited
UNITED STATES PATENTS

| | | | |
|---|---|---|---|
| 3,736,326 | 5/1973 | Denzel et al. | 260—295.5 B |
| 3,736,327 | 5/1973 | Denzel et al. | 260—296 H |

ALAN L. ROTMAN, Primary Examiner

U.S. Cl. X.R.

260—250 A, 256.4 R, 268 BC, 293.6, 295.5 B, 310 R; 424—250, 251, 263, 267